Dec. 5, 1933.  E. K. ORTT  1,937,586
HEDGE TRIMMER AND THE LIKE
Filed Dec. 30, 1931  3 Sheets-Sheet 1
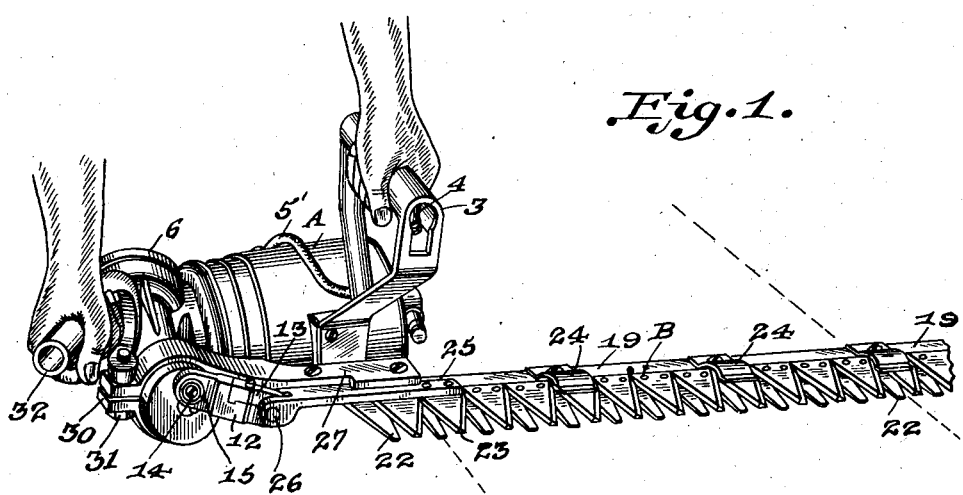
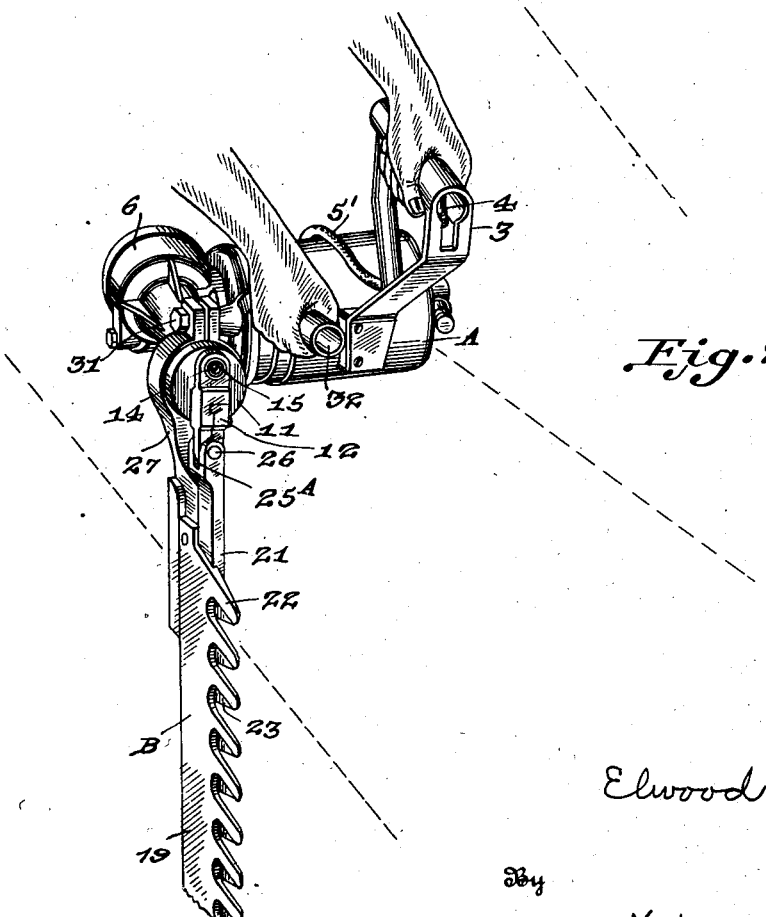
Inventor
Elwood K. Ortt
By
Hubert E. Peck  Attorney

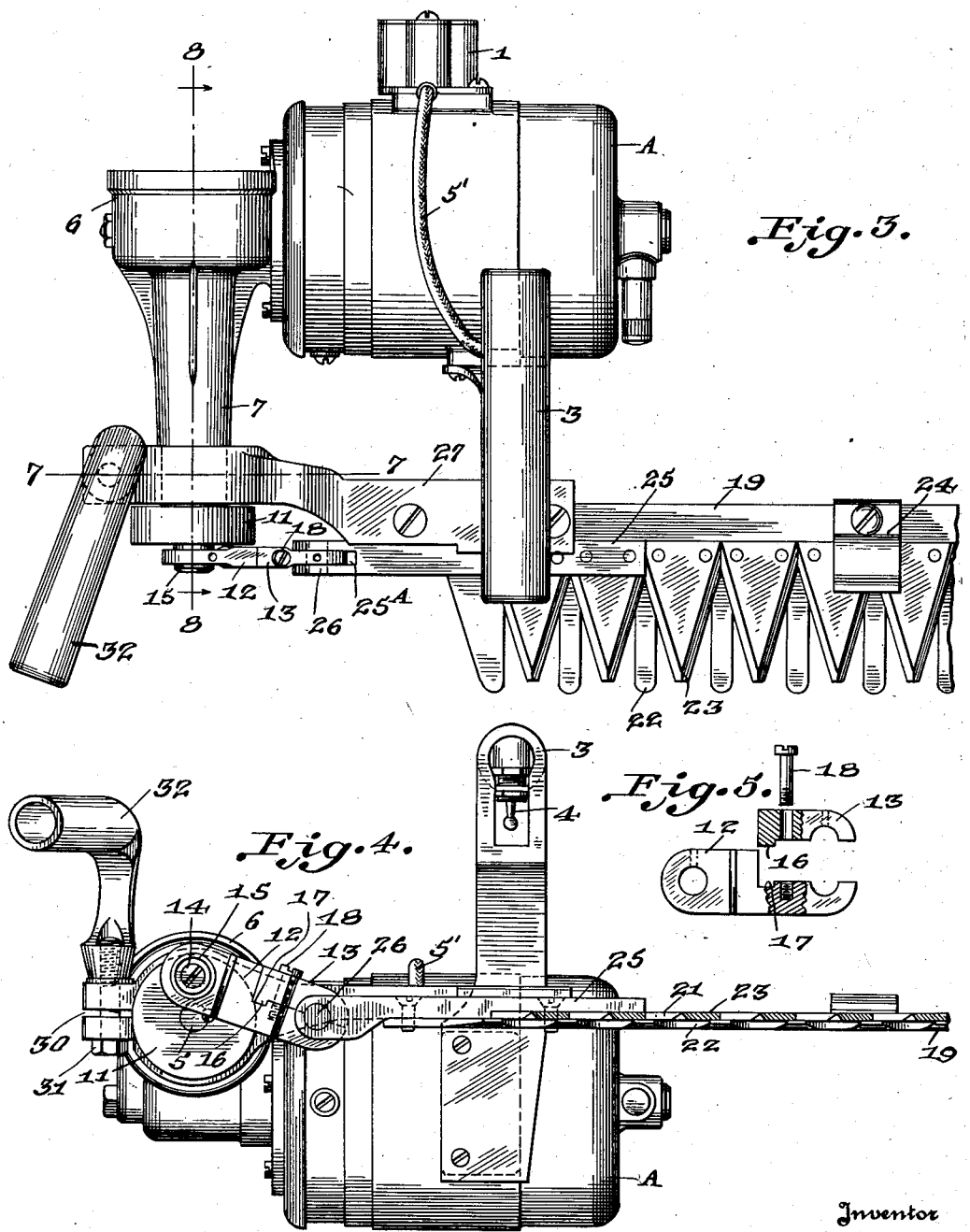

Dec. 5, 1933.    E. K. ORTT    1,937,586
HEDGE TRIMMER AND THE LIKE
Filed Dec. 30, 1931    3 Sheets-Sheet 3

Inventor
Elwood K. Ortt
By Hubert E. Peck    Attorney

Patented Dec. 5, 1933

1,937,586

UNITED STATES PATENT OFFICE 1,937,586

HEDGE TRIMMER AND THE LIKE

Elwood K. Ortt, Dixon, Ill.

Application December 30, 1931
Serial No. 583,978

4 Claims. (Cl. 30—11)

This invention relates to hedge trimmers and the like, and the objects and nature of the invention will be understood by those skilled in the art in the light of the following description of the accompanying drawings that show what I now believe to be the preferred mechanical expression or embodiment of my invention from among other forms, constructions and arrangements within the spirit and scope thereof.

An object of the invention is to provide a portable motor driven hedge trimmer adapted for cutting and trimming hedges and the like, which shall be of durable and sturdy construction and which has been designed and constructed to afford great ease of operation.

Another and equally important feature of my invention is a device of this character which is quickly and simply adjustable by the operator thereof, whereby the cutting operation may be carried on while the cutting elements are in a vertical, horizontal or an intermediate position to the operator.

With the foregoing and other objects in view my invention consists in certain novel arrangements, combinations, or features and structures, as more fully and particularly described and specified hereinafter.

Referring to the accompanying drawings forming part thereof:

Fig. 1 is a perspective view of the invention in operative position being held by the operator, the cutting elements being in horizontal position for cutting the top of a hedge or the like.

Fig. 2 is a perspective view similar to that of Fig. 1, showing the cutting elements in vertical position for cutting the sides of a hedge or the like.

Fig. 3 is a plan view of the invention.

Fig. 4 is a front elevation of the invention.

Fig. 5 is a side elevation of the driving arm detached from the instrument, with parts thereof separated and broken away in section.

Figure 6:
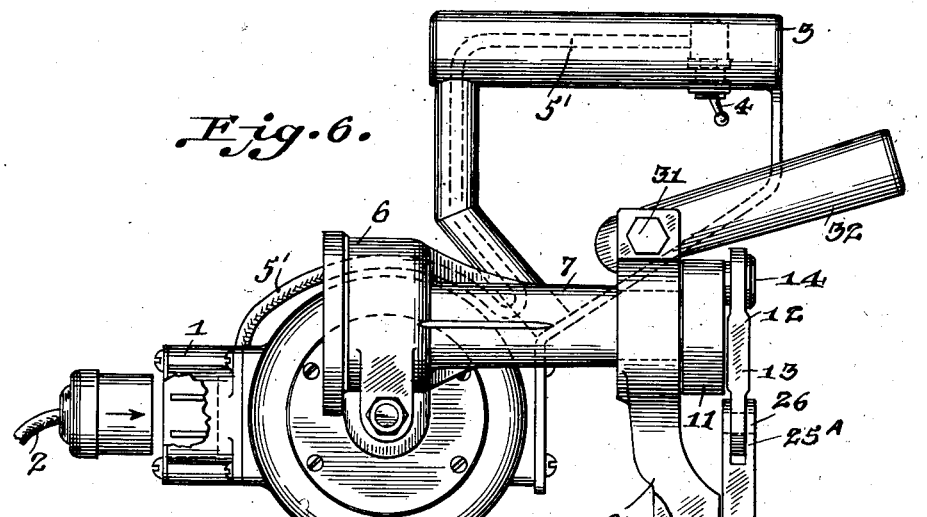
Fig. 6 is a side or end elevation of the invention with the cutting elements in vertical locked position.

The trimmer shown provides a supporting frame to be carried by both hands of the operator through the medium of top handles 4, 32, and cutting mechanism which includes an elongated usually straight cutter or finger bar provided with a complementary longitudinally reciprocatory knife bar, hung and supported from one end on a forwardly extending stud or journal rigid with said supporting frame, said cutting mechanism extending laterally from said journal and adjustable thereon in a plane perpendicular to the longitudinal axis of said journal for hedge top cutting and side cutting.

The supporting frame is made up of a housed rotary electric motor A, and a forwardly extending end gear housing or case 6, 7, rigid with the motor housing and arranged transversely thereof and providing the front journal on which the cutting mechanism is mounted and supported from one end.

The gear housing supports and encloses a reducing gear power transmission from the motor shaft to the knife bar for reciprocating the same. On the outside of the power unit A is provided a socket 1 which is connected by a cable 2 to a source of power, the cable 2 being of sufficient length to allow the device to be operated at distances from the source of current. I provide a hollow handle 3 rigidly secured to unit A and extending vertically upwardly therefrom and on the inner side of this handle I have constructed a snap switch 4 of the usual type which completes the electric circuit by means of the cable 5' running through the hollow handle to switch 4 and coupling it with the current inlet socket 1. In this manner control of the current operating the motor is convenient to the operator of the trimmer who merely has to snap the switch 4 with one of the fingers of the hand with which he is grasping the handle 3 in order to start or stop the motor unit A.

I have so designed and positioned this handle 3 with respect to the entire device that it not only serves as a control point for the motor unit but it serves as well, as one hold or handle of a pair of handles by which the operator supports or holds the device. The said handle 3 is so placed relative to the other handle and in respect to the entire organization as to carry the same in approximate balance at all times thereby greatly relieving the strain which might otherwise be placed upon the operator as well as insuring a smoother and more perfectly cut hedge or other object being cut by the device.

In coupling the motor unit A to the driven reciprocating member or knife bar 21 of the cutting element B it was found to be advantageous to so construct and design the coupling that the motor unit would be protected from the strains and jolts to which the cutting elements B would necessarily be subjected and which would be carried through any ordinary coupling to the motor unit itself. I have accomplished such a desirable coupling means by employing a gear reduction unit to transmit reciprocatory movement to the knife bar 21 of cutting elements B.

The said gear reduction unit which I utilize on my device comprises a motor shaft 10 extending outwardly from the unit A, the end of said shaft carrying a worm 9 which acts as a driving element for, and is in meshing engagement with a gear 8 carried on a shaft 5 extending outwardly from and at right angles to the motor shaft 10. The two gears 8 and 9 are enclosed within a gear casing 6, which is packed with a lubricant and the shaft 5 is enclosed within a shaft housing 7 rigid with the casing 6. A metal disk 6A provides a removable cover for the gear casing 6, thereby permitting greasing or inspection of the elements therein. It is readily apparent that upon operation of the motor unit A the shaft 5 will be caused to revolve by the transmission of the power through the members hereinbefore described and this revolving movement is transformed into reciprocatory movement for operation of the cutting elements by means to be described hereinafter.

An eccentric disk 11 is carried on the outer end of shaft 5 outside the shaft housing 7 for revolving with said shaft. A driving arm which is formed in two sections 12 and 13 is connected to said eccentric disk by means of a set screw 14 set in a concave washer 15 which securely locks the driving arm to the eccentric disk.

The inner section 12 of the driving arm is secured to the eccentric disk 11 off the center thereof the exact positioning of the inner section 12 thereon being determined according to the amount of throw required of the knife bar of the cutting elements B, to which the outer section 13 is secured by means to be hereinafter pointed out.

The sections 12 and 13 are each constructed with an overlapping section 16 and 17 so that one section fits snugly over the other. A threaded hole is drilled through the overlapping sections 16 and 17 for receiving therethrough a screw 18 which secures sections 12 and 13 of the driving arm together keeping them in position regardless of the strain placed thereon during operation of the cutter. Such a construction of driving arm will greatly facilitate the attachment thereof to the device without reducing the strength or durability of the arm, such construction of the arm insures speed and ease in removing it from the device while having the strength required during operation of the trimmer.

The cutting elements B consist of a long straight finger bar 19 longitudinally grooved to receive therein for reciprocal movement the head of a complementary knife bar 21. The cutter or finger bar 19 has the usual fingers 22 equally spaced thereon and ground to produce a sharp cutting edge. Riveted to the knife bar 21 are equally spaced fingers 23 the edges of which are ground to produce a fine cutting edge. Spring keepers 24 are riveted to the cutter bar 19, the keepers bearing down against the fingers 23 tend to keep said fingers against the fingers 22 of cutter bar 21 whereby the cutting will be sharper and more easily accomplished.

The inner end of the knife bar 21, is shown provided with a fixed arm 25, through which said bar is operatively connected with eccentric pin 14, by link 12. The inner end of the knife bar 21 is split as at 25A to receive therein the section 13 of the driving arm which is formed to receive therethrough the pin 26 connecting the driving arm section 13 with the knife bar 21.

In this manner I have transformed the revolving movement of the eccentric 11 into the reciprocal movement of the knife bar 21.

Figure 7:
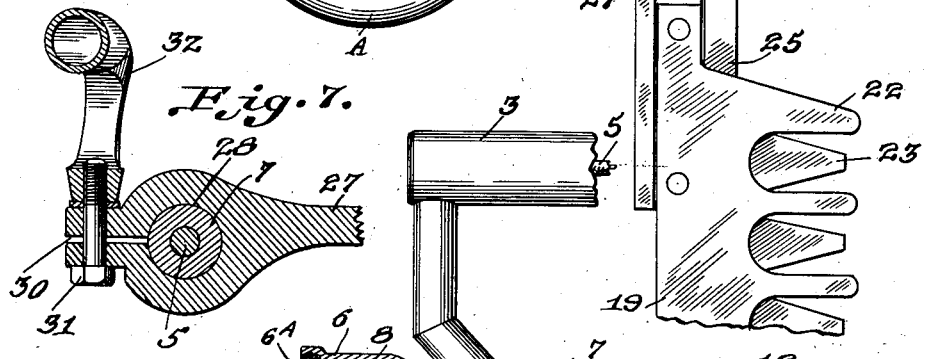
Fig. 7 is a section taken on line 7—7 of Fig. 3 showing the device for locking the cutting elements to restrain them from revolving movement.
Figure 8:
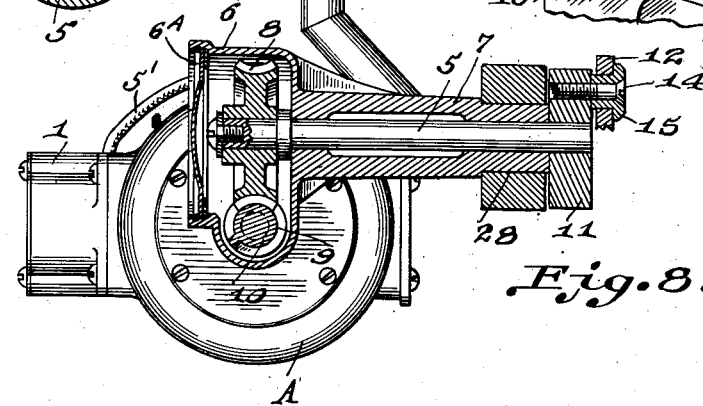
Fig. 8 is a section taken on line 8—8 of Fig. 3 through the gear and shaft housing showing the gear reduction unit.

A shoe member 27 which is secured to the cutter bar 19 is split as at 28, the two split ends being circular in shape so as to embrace and pass around the housing 7 of the shaft 5, the ends of shoe 27 being flattened to form smooth flat surfaces 30 adjacent one another as disclosed in the drawings Fig. 7. A hole is drilled through the surfaces 30 for receiving therethrough an upwardly extending cap screw 31 the upper end thereof being threaded and extending above the upper surface 30 for receiving thereon the end of an L-shaped handle 32, the end thereof being drilled to receive therein the upper part of threaded shank of the cap screw 31. When it is desired to tighten the circular split ends of shoe 27 so that they will securely embrace the shaft housing 5 the operator of the device merely turns the handle 32 in the proper direction causing it to be screwed down on cap screw 31 thereby bringing surfaces 30 toward each other with the resultant tightening of circular portions of shoe 27 about the housing 5.

When the handle 32 has been securely tightened it is understood that the cutting elements B will not be revolvable about the housing 5 but when it is desired to cut the side of a hedge or trim an object not having a perfectly horizontal top the handle 32 is merely loosened thereby allowing the cutting elements B to be revolved to a horizontal vertical or intermediate position and upon reaching the desired position the operator simply must tighten handle 32, thereby causing circular split ends of shoe 27 to tightly embrace shaft housing 6 to stop rotary movement thereof about the housing rigidly supporting the cutting elements.

By this construction of hedge trimmer whereby the cutting elements are made revolvable with respect to the rest of the device it is made possible for the operator to conveniently and easily cut the tops and sides of hedges or other shrubbery without changing his position, but by merely making the simple adjustment and then revolving the cutting elements to the desired angle for most conveniently carrying on the cutting operation.

The device of my invention is light in weight and with the arrangement of the handles thereon it is easily carried by the operator, from place to place and beside hedges and the like which are being trimmed.

It is within the contemplation of my invention and I have so designed and constructed it that it may be placed on a ground frame or carriage with a cradle to fit the motor and moved thereon beside the hedge being trimmed.

It is evident that various changes, modifications, and variations might be resorted to without departing from the spirit and scope of my invention and hence I do not wish to limit myself to the approximate disclosure hereof.

What I claim is:

1. A trimmer embodying a cutter bar including a knife bar, a power unit, operating connection therewith for reciprocating said knife bar, a driving shaft from said power unit, a driven shaft extending at right angles from said driving shaft, a housing for said shaft, a rigid arm from said cutter bar split to embrace said housing, a handle for securing said split ends of said arm about said housing for releasably securing said cutter bar and said knife bar in any angular position with respect to said power unit.

2. A trimmer including a cutter bar having a knife bar reciprocal thereon, a power unit, a driving shaft from said power unit, a driven shaft, a housing for said driven shaft, a supporting arm from said cutter bar split to embrace and rotatably engage said housing, a handle on said supporting arm, a handle on said power unit, and means operated by said arm carried handle for releasably clamping said supporting arm on said housing to position said cutter bar and said knife bar in any angular relation with respect to said power unit.

3. A portable motor driven hedge trimmer, including a carrying frame consisting of a housed motor and a gear case rigid with the motor housing; a longitudinally-elongated finger bar and its complementary cutting means; a power transmission from the motor through said case to drive said cutting means; said finger bar at one end mounted on and supported from said gear case and normally operatively fixed thereto, and adjustable thereon as a center in a plane perpendicular to the longitudinal axis of said gear case to and from horizontal and depending vertical positions; and two adjacent handles, one for each hand of the operator in carrying said frame and the cutter means and finger bar, with the frame in advance of the operator's body and the finger bar in a vertical plane in advance of the frame, one of said handles extending from the motor housing with the frame and finger bar when in horizontal adjustment, balanced from said handle, the other handle being carried by the end of the finger bar that is mounted on the gear case and being laterally movable over the gear case with said end when said bar is adjusted on said case as a center.

4. In a hedge trimmer, in combination; a housed motor and a gear case rigid therewith, forming the trimmer carrying frame; an elongated finger bar and complementary cutting means carried thereby; power transmission means extending through said case from the motor shaft for driving said cutting means; said finger bar having a rigid supporting end mounted for adjustment around said gear case as a center in a plane perpendicular to the longitudinal axis of said gear case to and from horizontal and depending vertical positions, said finger bar being thereby at one end supported from said case and projecting radially therefrom; means for securing said finger bar to said gear case in the desired adjustment and for releasing the same for adjustment; and two frame carrying handles, one of said handles secured to said carrying frame, and the adjacent other handle being coupled to the gear case through the medium of said bar end and being operative to actuate said finger bar securing means for securing said bar to and for releasing said bar for adjustment on said gear case.

ELWOOD K. ORTT.